Patented Aug. 10, 1943

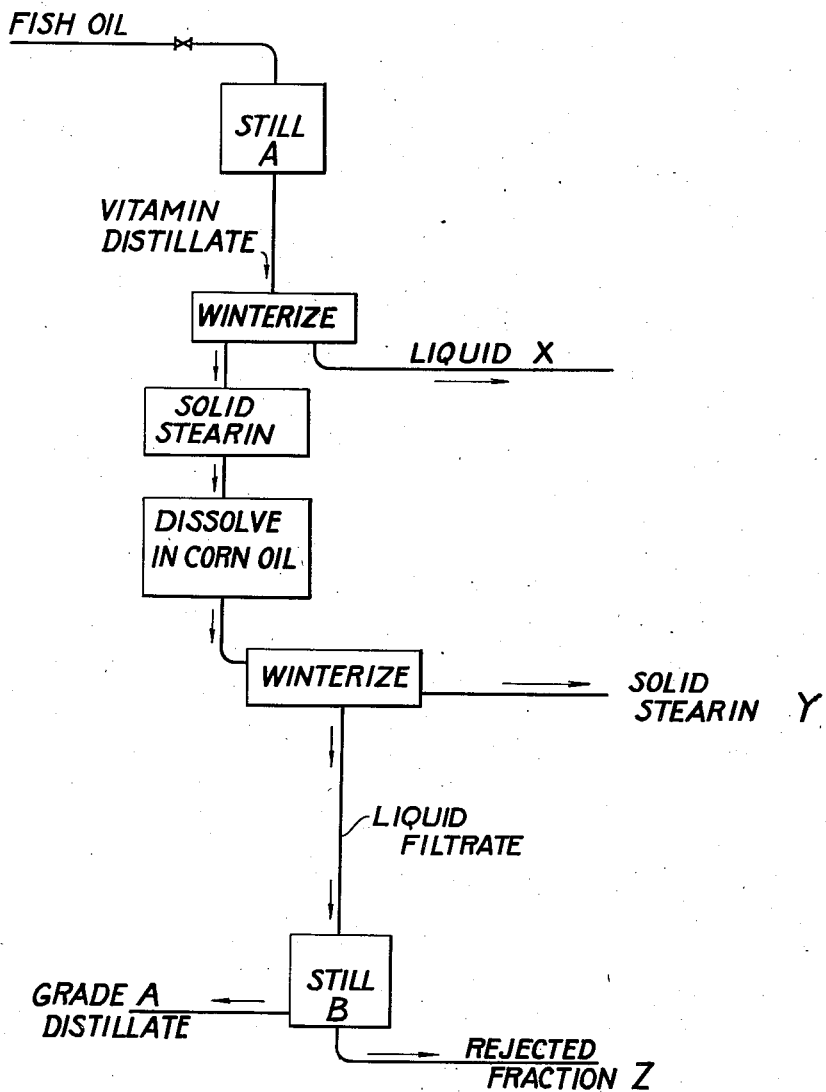

2,326,644

UNITED STATES PATENT OFFICE 2,326,644

VITAMIN PREPARATION

Kenneth C. D. Hickman, Rochester, N. Y., assignor to Distillation Products, Inc., Rochester, N. Y., a corporation of Delaware Application May 3, 1940, Serial No. 333,189

7 Claims. (Cl. 167—81)

This invention relates to the preparation of improved vitaminous products.

It has long been known to prepare improved fish oils containing vitamins by subjecting them to a winterizing treatment to cause separation of solid components of the fish oil. These separated solids are known in the trade as fish oil stearin. These stearins contain a high content of vitamins. Also it is known to subject fish oils to high vacuum distillation to separate distillates having a high vitamin content. I have found it expedient to winterize these products to improve their qualities for certain purposes. However, the stearins separated by the winterizing treatment have a high vitamin content.

This invention has for its object to provide procedure for preparing low melting or liquid vitamin concentrates from stearins. Another object is to provide vitamin products derived from stearins which have a high standard of quality. A further object is to provide procedure for improving the percentage yield of grade A concentrates obtainable by high vacuum distillation of a fish oil. Another object is to improve the state of the art. Other objects will appear hereinafter.

I have discovered that these and other objects can be accomplished in accordance with my invention which includes subjecting a vitamin-containing fish oil to distillation to separate a vitamin concentrate as a distillate, winterizing the distillate and treating the solid stearin separated in the winterizing treatment with a vegetable oil having a melting point below that of the stearin. This mixtures of stearin and vegetable oil is then winterized and the solid portion separated from the liquid. It has been found that the liquid portion contains most of the vitamin A while the solid fish oil stearins are rejected.

The foregoing describes my improved procedure as applied to high vacuum unobstructed path distillation. However, it is to be understood that the expedient of removing vitamins from a stearin by dissolving it in a low melting vegetable oil and winterizing is considered to be new and applicable to vitamin-containing fish stearins derived from any source.

In subjecting a fish oil to high vacuum unobstructed path distillation it is customary to separate various fractions containing high content of vitamins. Usually the preliminary fractions are rejected since they contain free fatty acids, odors, etc. The procedure for separating vitamin concentrates by distillation of fish oils is well known in the art and is described in various publications, such as, for instance, my Patents 2,180,356, 2,180,253, and Reissue 20,705. It will be understood that my invention is applicable to the fractions prepared by this procedure in general. However, my invention is of particular advantage when applied to distillates containing concentrated vitamin A and or D esters. These distillates are usually obtained at temperatures between about 130° and 240° C.

The distillate so obtained is subjected to winterizing which merely involves cooling for a relatively prolonged period of time so as to separate high melting constitutents. Usually winterizing procedure does not involve cooling below the freezing point of water. However, much lower temperatures can be used. The usual winterizing treatment involves cooling to a temperature of about 32–50°. 40° is often employed. When cooled to such temperatures, the distillate precipitates solids which can be removed by filtering or straining. The liquid filtrate thus obtained is a vitamin concentrate of good quality. My invention, however, is mainly involved in the treatment of the stearin thus obtained.

A low melting vegetable oil is added to the stearin and the mixture thoroughly intermingled and dissolved. This mixture is then winterized in the manner described above and the liquid portion again separated from the solids. By this procedure the vitamins contained in the stearin are transferred to the liquid portion which is predominantly a low melting vegetable oil. The stearin portion which represents the fish oil portion is rejected.

This liquid product represents a superior product, since it does not have the taste or odor of fish oils or the tendency to generate fishy taste. It can be marketed as such, but, preferably, it is subjected to high vacuum unobstructed path distillation to obtain a grade A distillate of high potency, high stability, and unusually bland taste. During this distillation preliminary fractions can be separated and these can be mixed with the solid stearin from the immediately preceding winterizing step. This mixture can, with advantage, be added to the original fish oil before the first distillation procedure.

The low melting vegetable oil is added to the stearin in quantities varying from ten parts of vegetable oil to one of stearin on one hand to one part vegetable oil 3 parts of stearin on the other. A 2:1 ratio is preferred. It should be understood, however, that these preparations are not critical and that larger or smaller amounts may be used with satisfaction. Examples of satisfactory low melting oils are corn oil, tea seed, wintered olive, and wintered cotton seed oils. The low melting oils should fail to freeze at temperatures 10° or more below the melting point of the fish stearin. A melting point of 20° or more, such as 40 or 50° below the melting point of the fish stearin, is preferred.

The treatment of stearin produced by winterizing a whole fish oil as in the prior art is carried out in the same manner, i. e. the stearin is dissolved in the low melting vegetable oil, the mixture winterized, and the liquid portion separated. This liquid portion contains the vitamins but is substantially free of the solid fish oil components. This material can then be distilled to increase or concentrate the vitamin content in the manner described above.

Again, I may prefer to winterize a crude fish liver oil separately, segregate the stearin fraction which contains useful amount of vitamins A and D, melt this with low melting vegetable oil and winterize as before. The liquid extract is an oil of particularly desirable properties as a vitamin bearing oil. It may be used as such or subjected to molecular distillation as before.

By a further modification, I have found that it is possible to prepare improved vitamin products by directly winterizing a mixture of fish oil, such as tuna liver or shark liver oil, and a low melting vegetable oil. This procedure is particularly valuable in connection with fish oils of high vitamin potency but of poor quality. Upon winterizing such a mixture a large portion of the fish oil glycerides are rejected in the stearin and the liquid portion is found to be high in vitamin content and substantially improved in odor, taste, and keeping qualities.

Refining treatment may be employed in conjunction with the various expedients described above. For instance, it is satisfactory to alkali refine the fish oil or the stearin before addition of the low melting vegetable oil. However, if the vegetable oil is not refined, it is often preferred to refine the low melting vegetable oil-fish oil stearin mixture.

I have shown elsewhere that vegetable oils contain natural antioxidants and that they can be distilled in a mixture with fish oils so that a vitamin A distillate having a high content of antioxidant is obtained. I, therefore, prefer to employ in this invention a vegetable oil which contains a high antioxidant content. This results in a vitamin distillate from the vegetable oil-stearin mixture which has increased stability. However, stability is also increased by the fact that the fish oil glycerides are rejected. Fish oils are known to rancidify rapidly and simultaneously cause destruction of their vitamin A content.

In the accompanying drawing, I have shown a diagrammatic flow sheet of the application of my invention to vitamin products produced by a combination of distillation and winterizing. Referring to the drawing, fish oil is subjected to high vacuum, unobstructed path distillation in still A resulting in a vitamin A distillate. This distillate is subjected to a winterizing treatment which gives a liquid portion X and a solid portion of stearin. This stearin is dissolved in a low melting vegetable oil such as corn oil. The mixture is winterized resulting in a solid stearin Y and a liquid filtrate. This liquid filtrate is subjected to high vacuum, unobstructed path distillation in still B and a grade A distillate is separated. Inferior fractions Z are obtained. Liquid X, solid stearin Y, and rejected fractions Z, can all be combined and added to the original fish oil going into the still A. By carrying out this procedure the percentage of grade A distillates obtained from a given quantity of fish oil is substantially increased.

EXAMPLE 1

*Production of a first-class vitamin A distillate from a low-grade commercial shark-liver oil stearin*

This material is generally a dark brown, mushy solid containing suspended matter and perhaps 5 per cent free fatty acid. The vitamin A content varies from 40,000–100,000 units per gram. In this example one part of shark stearin with an acid value of 6 and a vitamin A content of 80,000 units per gram is melted with two parts of crude corn oil. The mixture is chilled slowly to 40° F. and allowed to crystallize. The mixture is then filtered and there results a liquid portion equal to 2¼ parts and a solid portion of ¾ of a part. The liquid portion has an acid value of 5 and a vitamin A content of 65,000 units per gram. The liquid portion is now introduced into a multistage molecular still and a fraction is withdrawn containing 80 per cent of the original vitamin A at a concentration of 400,000 units per gram. The distillate is pale yellow in color, entirely free from fishy flavor and odor when first withdrawn from the still. The stability to oxidation is at least twice as great as that of the original crude shark stearin.

EXAMPLE 2

Commerical sardine oil is passed through the molecular still and 5 per cent removed as a distillate. This distillate contains approximately 10,000 units of vitamin A per gram, considerable vitamin D, and sterols. It is semi-solid. The distillate is melted with an equal quantity of refined peanut oil and the temperature lowered to 45° F. After the mixture has been crystallized, it is filtered and the filtrate is passed through a molecular still. A distillate is withdrawn holding 85 per cent of the vitamin A that was contained in the wintered filtrate. The potency is 50,000 units per gram, and the flavor compared with that of the original sardine oil is substantially bland.

EXAMPLE 3

A rich tuna-liver oil containing 50,000 units of vitamin D and 125,000 units of vitamin A is mixed with twice its volume of refined corn oil. The mixture is cooled to 35° and after crystallization is filtered. The filtrate contains the major portion of the vitamins A and D, while the sterols and most of the marine fats are left in the solid portion. This solid portion which still contains commercial values of vitamins A and D can be used as a second-grade source of vitamins or it may be re-leached. In any event the filtrate or combined filtrates may be used as such or may be passed through a molecular still of the centrifugal type and a distillate of vitamin D withdrawn having a potency of approximately 100,000 units. The overall yield of vitamin D varies from 50–90 per cent. The yield of vitamin A varies from 60–100 per cent.

What I claim is:

1. The process of extracting a vitamin from a fish oil stearin to obtain a vitamin product of improved taste, odor and color which comprises dissolving a fish oil stearin, which contains a fat soluble vitamin in a vegetable oil having a low melting point, cooling this mixture until the stearin-like solids separate, and separating the liquid portion from the solids whereby the vitamin in the stearin is transferred to the vegetable oil to leave an extracted stearin of substantially lower vitamin potency than the vegetable oil extract.

2. The process of extracting a vitamin from a fish oil to obtain a vitamin product of improved taste, odor and color which comprises adding a vegetable oil which has a low melting point to a fish oil, cooling this mixture to precipitate solid glycerides and high melting portions of the fish oil and then separating the liquid from the solids whereby the vitamin in the fish oil is transferred to the vegetable oil to leave an extracted fish oil of substantially lower vitamin potency than a vegetable oil extract.

3. The process which comprises dissolving a fish oil stearin which contains a fat soluble vitamin in a vegetable oil having a low melting point, cooling this mixture until the stearin-like solids separate, separating the liquid portion from the solids and subjecting this liquid to high vacuum, unobstructed path distillation to separate the vitamin content thereof in concentrated form.

4. The process which comprises dissolving a stearin derived from a fish oil which contains fat soluble vitamins in a vegetable oil which has a low melting point, cooling this mixture until the stearin-like solids separate, separating the liquid portion from the solid stearin, and then subjecting the liquid portion to high vacuum, unobstructed path distillation to separate the vitamin content thereof in concentrated form.

5. The process of preparing in improved vitamin product in high yield which comprises in combination subjecting a fish oil to high vacuum, unobstructed path distillation to separate a vacuum distillate in concentrated form, treating the distillate to separate a liquid portion and a solid stearin portion therefrom, dissolving the stearin portion in a low melting vegetable oil, winterizing this mixture to separate a solid stearin and a liquid filtrate, subjecting the liquid filtrate to high vacuum unobstructed path distillation and separating a vitamin concentrate as a distillate.

6. The process of preparing an improved vitamin product in high yield which comprises in combination, subjecting a fish oil to high vacuum unobstructed path distillation, to separate a vitamin distillate in concentrated form, winterizing to separate a liquid portion and a stearin from the distillate, dissolving the stearin in a low melting vegetable oil, winterizing this mixture to separate stearin and a liquid filtrate, subjecting the liquid filtrate to high vacuum unobstructed path distillation and separating a vitamin concentrate as a distillate.

7. The process of claim 6 in which the liquid portion from the first winterizing treatment and the solid from the second winterizing treatment are recycled by adding them to the fish oil prior to the first distillation treatment.

KENNETH C. D. HICKMAN.